United States Patent
Cole et al.

(10) Patent No.: US 10,655,052 B2
(45) Date of Patent: May 19, 2020

(54) METHOD AND PROCESS TO STABILIZE ASPHALTENES IN PETROLEUM FLUIDS

(71) Applicants: M-I L.L.C., Houston, TX (US); SCHLUMBERGER NORGE AS, Stavanger (NO)

(72) Inventors: Rachael Anne Cole, Sandnes (NO); Pradyumna Avinash Deshpande, Houston, TX (US); Chandrashekhar Yeshwant Khandekar, Katy, TX (US); Tore Nordvik, Sandnes (NO); Loic Regnault De La Mothe, Houston, TX (US); Elodie Shaw, Grenoble (FR); Laure Canal, Grenoble (FR); Marine Dugand, Grenoble (FR); José Santiago, Limony (FR)

(73) Assignees: M-I L.L.C., Houston, TX (US); SCHLUMBERGER NORGE AS, Stavanger (NO)

( * ) Notice: Subject to any disclaimer, the term of this patent is extended or adjusted under 35 U.S.C. 154(b) by 0 days.

(21) Appl. No.: 15/395,188

(22) Filed: Dec. 30, 2016

(65) Prior Publication Data

US 2018/0187064 A1 Jul. 5, 2018

(51) Int. Cl.
*C09K 8/524* (2006.01)
*C08G 83/00* (2006.01)

(52) U.S. Cl.
CPC ............ *C09K 8/524* (2013.01); *C08G 83/002* (2013.01)

(58) Field of Classification Search
CPC ........ C09K 8/588; C09K 8/035; C09K 8/524; C09K 2208/12; C09K 8/512; C09K 8/514; C09K 8/528; C09K 8/605; C09K 8/685; C09K 8/887; C09K 8/90; C09K 2208/28; C09K 2208/32; C09K 8/532; C09K 8/584; C09K 8/68; C09K 8/805; C09K 8/88; E21B 41/02; E21B 43/01; E21B 37/06; E21B 43/12; E21B 43/126; E21B 43/20; E21B 43/26; E21B 43/267
See application file for complete search history.

(56) References Cited

U.S. PATENT DOCUMENTS

| | | |
|---|---|---|
| 5,143,594 A | 9/1992 | Stephenson et al. |
| 5,214,224 A | 5/1993 | Comer et al. |
| 5,232,963 A | 8/1993 | Comer et al. |
| 5,788,722 A | 8/1998 | Emert et al. |
| 6,451,920 B1 | 9/2002 | Harrison et al. |
| 6,743,757 B2 | 6/2004 | Bell et al. |
| 6,946,524 B2 | 9/2005 | Breuer et al. |
| 7,091,306 B2 | 8/2006 | Heddadj et al. |
| 7,122,113 B2 | 10/2006 | Cornelisse |
| 7,329,635 B2 | 2/2008 | Dickakian et al. |
| 7,754,657 B2 | 7/2010 | Trimble et al. |
| 7,795,183 B2 | 9/2010 | Wilkes et al. |
| 8,177,960 B2 | 5/2012 | Rouet et al. |
| 8,263,535 B2 | 9/2012 | Hueffer et al. |
| 8,695,707 B2 | 4/2014 | Li et al. |
| 8,728,995 B2 | 5/2014 | Huang et al. |
| 8,877,694 B2 | 11/2014 | Jones et al. |
| 2010/0170829 A1 | 7/2010 | Ng et al. |
| 2011/0162558 A1 | 7/2011 | Mena Cervantes et al. |
| 2012/0028521 A1* | 2/2012 | Garner ............... C10M 169/045 440/88 L |
| 2012/0088700 A1 | 4/2012 | Hart |
| 2012/0220807 A1 | 8/2012 | Miller |
| 2012/0266837 A1 | 10/2012 | Barton et al. |
| 2013/0270157 A1 | 10/2013 | Ferrara |
| 2014/0038705 A1 | 2/2014 | Wolf et al. |
| 2014/0190692 A1 | 7/2014 | Hibbeler et al. |
| 2014/0357532 A1 | 12/2014 | Sarda et al. |

(Continued)

FOREIGN PATENT DOCUMENTS

| | | |
|---|---|---|
| EP | 1666570 B1 | 1/2008 |
| GB | 2337522 A | 11/1999 |
| WO | 2002/102928 A2 | 12/2002 |
| WO | WO02102928 | * 12/2002 |
| WO | 2004/065430 A1 | 8/2004 |
| WO | WO2004/092227 | * 10/2004 |
| WO | 2011-071747 A1 | 6/2011 |
| WO | 2013/112503 A1 | 8/2013 |
| WO | 2015/080747 A1 | 6/2015 |
| WO | 2016-053634 A1 | 4/2016 |
| WO | WO2016/053634 | * 4/2016 |
| WO | 2016/200856 A1 | 12/2016 |

OTHER PUBLICATIONS

Chavez-Miyauchi et. al., Aromatic Polyisobutylene Succinimides as Viscosity Reducers with Asphaltene Dispersion Capability for Heavy and Extra-Heavy Crude Oils, Energy Fuels 2013, 27, 1994-2001.*

(Continued)

*Primary Examiner* — Kumar R Bhushan
(74) *Attorney, Agent, or Firm* — Osha Liang LLP (57) ABSTRACT

Methods may include emplacing into a hydrocarbon production stream a composition containing an asphaltene inhibitor, wherein the asphaltene inhibitor includes the formula:

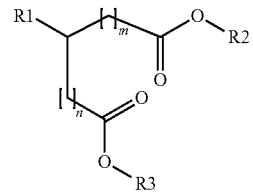

wherein R1 is an alkyl chain having a carbon number in the range of greater than 40 to 200, R2 is a multiester group, R3 is hydrogen, an ion, or an alkyl chain having a carbon number in the range of 1 to 200, m is an integer selected from 0 to 4, and n is an integer selected from the range of 0 to 4, wherein the sum of m and n is 1 or greater.

14 Claims, 2 Drawing Sheets

(56) References Cited

U.S. PATENT DOCUMENTS

2015/0128484 A1    5/2015   Nordvik et al.
2015/0307788 A1*   10/2015  McDaniel .............. C10G 33/04
                                                       524/105
2016/0046855 A1    2/2016   Mastrangelo et al.

OTHER PUBLICATIONS

English translation of PCT International Search Report and Written Opinion dated Jul. 26, 2017, issued by the European Patent Office in corresponding International Application No. PCT/IB2016/001980 (12 pages).

English translation of the International Search Report and Written Opinion dated May 23, 2018, by the Korean Intellectual Property Office, International Application Division, in corresponding International Application No. PCT/US2017/069109 (11 pages).

International Preliminary Report on Patentability and Written Opinion dated Jul. 2, 2019, in corresponding International Application No. PCT/US2017/069109 (9 pages).

* cited by examiner

METHOD AND PROCESS TO STABILIZE ASPHALTENES IN PETROLEUM FLUIDS

BACKGROUND

The stability of produced crude oil may change in response to variations in pressure, temperature, or composition, which may increase the tendency of certain components such as asphaltenes to agglomerate into larger particles and/or form insoluble residues. Asphaltenes are organic heterocyclic macromolecules which may be found in crude oil and are generally stabilized by maltenes and other compositions under reservoir conditions.

SUMMARY

This summary is provided to introduce a selection of concepts that are further described below in the detailed description. This summary is not intended to identify key or essential features of the claimed subject matter, nor is it intended to he used as an aid in limiting the scope of the claimed subject matter.

In one aspect, methods in accordance with embodiments of the present disclosure may include emplacing into a hydrocarbon production stream a composition containing an asphaltene inhibitor, wherein the asphaltene inhibitor includes the formula:

wherein R1 is an alkyl chain having a carbon number in the range of greater than 40 to 200, R2 is a multiester group, R3 is hydrogen, an ion, or an alkyl chain having a carbon number in the range of 1 to 200, m is an integer selected from 0 to 4, and n is an integer selected from the range of 0 to 4, wherein the sum of m and n is 1 or greater.

In another aspect, methods in accordance with embodiments of the present disclosure may include emplacing in a wellbore a composition containing an asphaltene inhibitor, wherein the asphaltene inhibitor comprises esters of the formula:

wherein R1 is an alkyl chain having a carbon number in the range of greater than 40 to 200; R2 is a multiester group; R3 is hydrogen, an ion, or an alkyl chain having a carbon number in the range of 1 to 200; m is an integer selected from 0 to 4; and n is an integer selected from the range of 0 to 4, wherein the sum of m and a is 1 or greater.

Other aspects and advantages of the invention will be apparent from the following description and the appended claims.

DETAILED DESCRIPTION

Embodiments disclosed herein are directed to methods and compositions for inhibiting the deposition of asphaltenes from hydrocarbon fluids within wellbores. In one or more embodiments, methods and compositions in accordance with the present disclosure are directed to inhibiting or dispersing asphaltene deposition for topside and downhole oilfield applications. Treatment fluid compositions of the present disclosure may be used in downhole and surface applications including dispersion of existing residues on wellbore equipment and wellbore surfaces, in addition to inhibition of asphaltene precipitation during production and transportation of various hydrocarbon fluids.

Asphaltenes may precipitate out of the oil, creating aggregates that may entrain solids and other materials, which may initiate the formation of sludges and other insoluble residues. Asphaltene deposits may accumulate on the surfaces of completions equipment and reservoir pore throats, which can lead to production impairment and other operational problems including but not limited to, plugging of equipment, pressure loss, increased utility costs, lost production due to downtime, and downgraded products from insufficient feeds.

Asphaltenes are organic materials containing aromatic and naphthenic ring compounds that may come in the form of polyaromatic or polycyclic structures, and which may include a number of alkyl chains and heteroatoms such as nitrogen, sulfur and oxygen. In addition, asphaltenes may also include associated ions such as vanadium, nickel, and other metals. Asphaltenes are often described as a component of the "asphaltene fraction," which contains a wide variety of heavy and polar molecules from crude oils that are soluble in aromatic solvents, but insoluble in normal alkane-based solvents such as pentane or heptane.

Asphaltenes exist as a colloidal suspension stabilized by aromatic resins in crude oil. The stability of asphaltic dispersions may depend in part on the ratio of resin to asphaltene molecules, which may be used to estimate potential damage created by asphaltenes. During production and transport of hydrocarbon fluids, asphaltenes may precipitate as a result of pressure drop, composition changes, pressure depletion above the saturation pressure, temperature changes, shear from turbulent flow, intermixing of incompatible fluids or materials that break the stability of the asphaltic dispersion, and other parameters such as pH, solution carbon dioxide, water cut, electro-kinetic effects.

Asphaltene inhibitor and treatment fluid compositions in accordance with the present disclosure may be used as additives that are provided to hydrocarbon mixtures to disperse and/or prevent flocculation of heavy hydrocarbons and asphaltene aggregation. Treatment fluids in accordance with the present disclosure may be suitable for use in downhole environments, at the surface, and in pipelines used to transport hydrocarbons. In some embodiments, asphaltene inhibitors may be placed into a hydrocarbon production stream at any point, including within the wellbore, at the surface of the well, and during transport of the hydrocarbon stream through pipelines or storage tanks.

Asphaltene inhibitor compositions of the present disclosure may be mixed with hydrocarbon fluids either by batch treatment or by continuous injection. In some embodiments, asphaltene inhibitors may be used as a wellbore fluid additive, and in other treatment fluids such as squeeze treatments. Further, compositions in accordance with the present disclosure may inhibitor asphaltene agglomeration in both downhole and surface applications, including at surface and downhole HPHT well conditions. In some embodiments, treatment compositions may contain an asphaltene inhibitor combined with one or more aromatic solvents.

In one or more embodiments, treatments in accordance with the present disclosure may stabilize asphaltenes in production fluids, reducing and/or preventing asphaltene deposition, which may increase oil production and minimize the need for maintenance and cleaning. Without being limited by any particular theory, it is envisioned that compounds in accordance with the present disclosure may mimic resin acids that naturally stabilize asphaltenes in the well by interacting with various heteroatoms in the asphaltenes. Asphaltene inhibitors in accordance with the present disclosure may also incorporate some degree of branching in the molecular structure of the inhibitor, which may provide the same inhibitory effects as linear asphaltene inhibitors without the associated increase in viscosity.

In one or more embodiments, asphaltene inhibitors in accordance with the present disclosure may be a multiester asphaltene inhibitor, As used herein, the term "multiester" is used to describe a molecule having two or more hydroxy functional groups modified to contain two or more ester bonds to a molecule (or molecules) having one or more carboxylic acid groups. Multiester asphaltene inhibitors in accordance with the present disclosure may include from 4 to 100 ester groups in some embodiments, and from 5 to 20 ester groups in other embodiments.

Multiester asphaltene inhibitors in accordance with the present disclosure may include: dendrimeric compounds branched with respect to a hydroxy functional dendrimer, branched polymeric structures, or esterified polyols that may have some degree of cross-linking between the polyol species prior to or following esterification to form the multiester. The asphaltene inhibitors of the present disclosure will be discussed in the following sections with respect to the constituent reactants used to produce the final branched compounds.

Dendrimeric Asphaltene Inhibitors

In one or more embodiments, asphaltene inhibitors in accordance with the present disclosure may be prepared from the reaction of a hydroxy-functional dendrimer and an alkyl cyclic anhydride. As used herein, the term "hydroxy-functional dendrimer" describes a dendrimeric molecule having two or more hydroxy groups. In some embodiments, hydroxy-functional dendrimer in accordance with the present disclosure may have three dimensional macrostructure, which may be generational or tree-like that terminates in one or more hydroxy moieties. Branched hydroxy-functional dendrimers may be symmetric with respect to a central or quaternary, carbon, or may be asymmetrical to some degree.

In some embodiments, dendrimeric molecules in accordance with the present disclosure may be prepared using convergent synthesis in which multiple branches are generated and grafted onto a polyalcohol core molecule. Dendrimeric molecules in accordance with embodiments of the present disclosure may also be generated from divergent synthesis methods in which a polyalcohol core is reacted with a multifunctional molecule such as a hydroxy acid to prepare a dendrimer having one or more generations. In one or more embodiments, the number of free hydroxy groups in the hydroxy-functional dendrimer may be tuned by controlling the number of generations in the dendrimeric molecule, with increased numbers of generations resulting in increased numbers of free hydroxy groups. Polyalcohol cores in accordance with the present disclosure may include polyalcohols such as glycerol, trimethylolethane, trimethylolpropane, pentaerythritol, propylene glycol, butanetriol, inositol, erythritol, sorbitol, sugars such as mannitol, xylitol, and the like, and other symmetric and asymmetric polyalcohols. Multifunctional molecules that may be used to construct dendrimeric molecules in accordance with the present disclosure include hydroxy acids such as 2,2-dimethylol propionic acid. In some embodiments, hydroxy-functional dendrimer may include commercially available compounds such as BOLTORN™ dendrimers, from PERSTORP (Malmo, Sweden), which is a family of dendritic polyols with large numbers of terminal hydroxy groups.

Hydroxy-functional dendrimers in accordance with the present disclosure may have sufficient branching to possess at least 8 terminal hydroxyl groups, or at least 12 or 16 terminal hydroxyl groups in other embodiments. The terminal hydroxyl groups of the hydroxy-functional dendrimer of the present disclosure may be modified through esterification with alkyl cyclic anhydrides, such as an alkyl succinic anhydride, to contain two or more ester bonds.

In some embodiments, dendrimeric asphaltene inhibitors in accordance with the present disclosure may be prepared from a hydroxy-functional dendrimer having a hydroxyl value, as determined by ASTM D 1957, within the range of 230 to 260 mg KOH-/g. Dendrimeric compounds in accordance with the present disclosure may also possess a weight average molecular weight within the range of 5,500 Da to 6,000 Da prior to reaction with one or more alkyl cyclic anhydride.

In some embodiments, dendrimeric asphaltene inhibitors may be a multiester having a number of ester bonds that range from 1 to 50. Depending on the total number of hydroxy groups available on the dendrimeric species, the ratio of the alkyl succinic anhydride to the hydroxy-functional dendrimer may range from between 1:1 and 50:1 in some embodiments, or from 1:1 to n:1, where n is an integer describing the total number of hydroxy groups on the dendrimer, in particular embodiments.

In one or more embodiments, compositions in accordance with the present disclosure may include a compound of the formula:

wherein R1 is an alkyl chain having a carbon number in the range of greater than 40 to 200, R2 is a dendrimeric multiester group, R3 is hydrogen, an ion, or an alkyl chain having a carbon number in the range of 1 to 200, m is an integer selected from 0 to 4, and n is an integer selected from the range of 0 to 4, wherein the sum of m and n is 1 or greater. In some embodiments, R1 may be an alkyl chain having a carbon number within the range of 50 and 100, or within the range of 60 and 75, R3 may be H, the sum of m and n may be 1, and R2 may be a dendrimeric multiester group containing between 8 to 50 ester groups, In another aspect, embodiments of the present disclosure are directed to compositions that include the formula:

wherein R1 is an alkyl chain having a carbon number of greater than 40 to 200, R2 is a dendrimeric multiester group, X is —OR3 or —NR4R5 or —OM, wherein R3 is an alkyl or aryl group having a carbon number of 1 to 200, R4 and R5 are independently hydrogen or an alkyl, alkenyl, alkoxyalkyl, or aryl group having a carbon number of 1 to 200; M is an alkali metal, alkaline earth metal, ammonium, alkyl-substituted ammonium, or aryl-substituted ammonium ion, each of m and n is an integer from 0 to 4, and the sum of m and n is 1 or greater.

In some embodiments, dendrimeric asphaltenies may have a weight-average molecular weight in the range of 900 Da to 100,000 Da, or in the range of 10,000 Da to 50,000 Da. Dendrimeric asphaltene inhibitors in accordance with the present disclosure may include an R1 containing a polymer, including branched and linear polymers, composed of monomers such as ethylene, propene, butylene, isobutylene, or combinations thereof. In some embodiments, dendrimeric asphaltene inhibitors may contain a dendrimer moiety R2 containing a polyalcohol-based core prepared from recurring generations of a polyol such as pentaerythritol or 2,2-dimethylolpropionic acid.

In one or more embodiments, dendrimeric asphaltene inhibitors in accordance with the present disclosure may be prepared by reacting a polyisobutylene-substituted succinic anhydride with a hydroxy-functional dendrimer. In some embodiments, the molar ratio of alkyl cyclic anhydride to hydroxy-functional dendrimer is within the range of 10:1 to 30:1, or within the range of 15:1 to 25:1, or about 20:1. In some embodiments, the alkyl cyclic anhydride has a weight average molecular weight within the range of 500 Da to 5,000 Da, or within the range of 800 Da to 3,500 Da. Dendrimeric asphaltene inhibitors in accordance with the present disclosure may contain a reaction product of a polyisobutylene-substituted succinic anhydride and a hydroxy functional dendrimer, wherein the molar ratio of polyisobutylene-substituted succinic anhydride to hydroxy-functional dendrimer is within the range of 10:1 to 30:1.

Polymeric Asphaltene Inhibitors

Asphaltene inhibitors in accordance with the present disclosure may include "brush" or "comb" polymers produced by the reaction of an alkyl succinic anhydride with a hydroxy vinyl monomer to prepare a "macromonomer" that is polymerized. In some embodiments, polymeric asphaltene inhibitors may be prepared by reacting an alkyl cyclic anhydride with a polymer prepared from the polymerization of a "hydroxy vinyl monomer." As used herein, a hydroxy vinyl monomer is a compound having one or more hydroxyl groups and one or more polymerizable carbon-carbon double bonds.

In one or more embodiments, asphaltene inhibitors may be a multiester prepared from the esterification of a hydroxyl vinyl monomer having one or more hydroxy groups. Hydroxy vinyl monomers that may be modified by an esterification reaction with an alkyl cyclic anhydride in accordance with the present disclosure include acrylates, and equivalent methacrylates of each of the following acrylates, such as hydroxyethyl acrylate, hydroxypropyl acrylate, 1,3-butyleneglycol monoacrylate, 1-bromo-2-hydroxypropyl acrylate, hexandiol monoacrylate, neopentylglycol monoacrylate, trimethylolpropane diacrylate, pentaerthyritol acrylate, dipentaerythritol acrylate, and the like. Other hydroxy vinyl monomers may include polymerizable monomers containing one or more hydroxy groups such as hydroxylbutyl vinyl ether, 1,4-cyclohexanedimethanol mono vinyl ether, vinyl alcohol, allyl alcohol, crotyl alcohol, p-vinylbenzyl alcohol, trimethylolpropane diallyl ether, N-methylolacrylamide, and the like.

In one or more embodiments, asphaltene inhibitors may be prepared from a linear or branched polymer having a number of free hydroxy groups to which alkyl succinic anhydrides have been grafted on to the polymer backbone to create polymer comb or polymer brush structure. The molar ratio of the alkyl succinic anhydride to the hydroxy groups on the polymer chain may range from between 1:1 and 50:1 in some embodiments, or from 1:1 to n:1, where n is an integer describing the total number of hydroxy groups on the polymer, in particular embodiments. In some embodiments, hydroxy vinyl monomers may be combined with one or more comonomers to produce a co-, ter-, or water-polymer as needed to modify the desired properties of the asphaltene inhibitor such as solubility, temperature stability, and net ionic charge.

In addition to polymers, copolymers, terpolymers, etc., prepared from the hydroxy vinyl monomers discussed above, hydroxy-containing polymers suitable for reaction with alkyl cyclic anhydrides in accordance with the present disclosure may also include partially hydrolyzed vinyl acetate, partially hydrolyzed ethylene-vinyl acetate, partially hydrolyzed polyvinyl formate, and the like.

In one or more embodiments, a polyisobutylene succinic anhydride may be reacted with a 2-hydroxyalkyl acrylate or 2-hydroxyalkyl methacrylate monomer to generate a macromonomer having available ethylenic unsaturation. Free radical-initiated polymerization of the macromonomer may then yield a comb polymer that may be used in the asphaltene inhibitor compositions described herein. In some embodiments, molecular weight may be limited by including one or more chain-transfer agents such as lauryl mercaptan in the reaction mixture during the free-radical polymerization step. The reaction to produce the comb copolymer is illustrated by the reaction of polyisobutylene succinic anhydride with 2-hydroxyethyl methacrylate, followed by radical-initiated polymerization of the resulting macromonomer:

-continued

Polymeric asphaltene inhibitors in accordance with the present disclosure may have a molecular weight in the range of 10,000 to 200,000 Da, or in some embodiments, may fall within the range of 20,000 to 100,000 Da. As used herein, molecular weight refers to weight average molecular weight ($M_w$) unless indicated otherwise.

Polyol-Based Asphaltene Inhibitors

In one or more embodiments, asphaltene inhibitors may include multiesters prepared from the reaction of an alkyl cyclic anhydride and a polyol. Polyols in accordance with the present disclosure may include hydroxy compounds having two or more hydroxyl groups such as glycerol, trimethylolethane, trimethyloipropane, pentaerythritol, propylene glycol, butanetriol, inositol, erythritol, sorbitol, sugars such as mannitol, xylitol, and the like. In some embodiments, polyols may be oligomerized by etherification prior to reaction with alkyl cyclic anhydrides in accordance with the present disclosure in order to introduce a degree of branching in the structure. In some embodiments, branching may also be introduced by reacting the product of the reaction between an alkyl cyclic anhydride and a polyol with an alkyl alcohol.

In one or more embodiments, asphaltene inhibitors may include a reaction product of polyisobutylene succinic anhydride (PIBSA) and glycerol:

X = H or Polyester of glycerol + PIBSA

In some embodiments, the reaction is performed such that at least some of the PIBSA is fully reacted with hydroxyl groups of the glycerol, thus enabling a greater degree of branching. In some aspects, the molar ratio of glycerol to PIBSA in the reaction mixture is within the range of 1:1 to 5:1. In some aspects, the molar ratio of glycerol recurring units to PIBSA recurring units in the reaction product obtained is within the range of 1:10 to 10:1.

In one or more embodiments, an asphaltene inhibitor of the present disclosure may include an asphaltene inhibitor synthesized from an esterification reaction of a polyol and an alkyl succinic anhydride having a molar ratio of polyol to alkyl succinic anhydride will be within the range of 1:1 to 5:1, or in the range of 1.5:1 to 3.0:1.

Alkyl Cyclic Anhydride

In one or more embodiments, multiester asphaltene inhibitors may be prepared from the reaction of a polyhydroxy compound or polymerizable hydroxy compound and an alkyl cyclic anhydride. In one or more embodiments, alkyl cyclic anhydrides may be selected from anhydrides prepared from the polymerization of a small-molecule unsaturated compound such as ethylene, propene, butylene, or isobutylene. In some embodiments, the molecular weight of the constituent alkyl chain of the alky cyclic anhydride may range from 500 Da to 10,000, 500 Da to 5,000 Da, or from 800 Da to 3,500 Da. The cyclic anhydride component of the alkyl cyclic anhydrides may contain a cyclic anhydride moiety such as succinic anhydride, glutaric anhydride, tetrahydrophthalic anhydride, hexahydrophthalic anhydride, phthalic anhydride, norbornene-2,3-dicarboxylic anhydride, and naphthalenic dicarboxylic anthydride. In some embodiments, alkyl cyclic anhydrides may include polyisobutylene succinic anhydride (PIBSA).

In some embodiments, alkyl cyclic anhydrides in accordance with the present disclosure may be of the general formula:

wherein R1 is an alkyl chain having a carbon number of greater than 40 to 200; m is an integer selected from 0 to 4; and n is an integer selected from the range of 0 to 4, wherein the sum of m and n is 1 or greater.

Upon the reaction between the alkyl cyclic anhydride and a hydroxyl-containing compound (such as those described above), an asphaltene may be generated. In some embodiments, the free carboxylic acid generated from the initial reaction of alkyl cyclic anhydride with a hydroxy functionalized species may be used as is or reacted further with a second hydroxy functionalized species to form a second ester.

Asphaltene inhibitors in accordance with the present disclosure may be of the general formula:

wherein R1 is an alkyl chain having a carbon number of greater than 40 to 200; R2 is a multiester group; R3 is a covalent hydrogen, an alkyl chain having a carbon number 1 to 200, or a ion; m is an integer selected from 0 to 4; and n is an integer selected from the range of 0 to 4, wherein the sum of m and n is 1 or greater.

In one or more embodiments, asphaltene inhibitor compositions may include compounds of the formula:

wherein R1 is an alkyl chain having a carbon number of greater than 40 to 200, R2 is a multiester group, X is —OR3 or —NR4R5 or —OM, wherein R3 is an alkyl or aryl group having a carbon number of 1 to 200, R4 and R5 are independently hydrogen or an alkyl, alkenyl, alkoxyalkyl, or aryl group having a carbon number of 1 to 200; M is an alkali metal, alkaline earth metal, ammonium, alkyl-substituted ammonium, or aryl-substituted ammonium ion, each of m and n is an integer from 0 to 4, and the sum of m and n is 1 or greater. When X is —OM and M is an alkaline earth metal, it will be understood that the metal may coordinate with one or two groups having the indicated structure.

In one or more embodiments, asphaltene inhibitors described by the formula above may be made by reacting a polyisobutylene-substituted succinic anhydride with a hydroxy-functional dendrimer, followed by conversion of any free carboxylic acid groups generated from the anhydride ring-opening reaction to an acid salt (X is OM), an ester (X is OR3), or an amide (X is NR4R5). In some embodiments, asphaltene inhibitors described by the formula above may be made by reacting a polyisobutylene-substituted succinic anhydride with a hydroxyalkyl acrylate monomer, followed by radical-initiated polymerization of the resulting macromonomer, and conversion of any free carboxylic acid groups from the anhydride to an acid salt (X is OM), an ester (X is OR3), or an amide (X is NR4R5). In some embodiments, asphaltene inhibitors described by the formula above may be made by reacting a polyisobutylene-substituted succinic anhydride with a polyol followed by conversion of any free carboxylic acid groups from the anhydride to an acid salt (X is OM), an ester (X is OR3), or an amide (X is —NR4R5).

Conversion of free carboxylic acid groups from the anhydride to an acid salt, an ester, or an amide (after reaction of the polyisobutylene-substituted succinic anhydride) unexpectedly prevents an undesirable reverse reaction in which the anhydride reforms and the hydroxy-functional dendrimer, hydroxyalkyl acrylate copolymer, or polyol is eliminated. The undesirable reverse reaction has been found to occur at the elevated-temperature conditions in which the compositions are normally used for dispersing asphaltenes or inhibiting asphaltene deposition. Thus, converting the free carboxylic acid groups by neutralization or further derivatization to esters or amides improves the thermal stability of the products and extends their performance.

In one or more embodiments, asphaltene inhibitors in accordance with the present disclosure may be combined with a neutralizing agent that may prevent degradation and composition instability at elevated temperatures. Elevated temperatures may be under normal wellbore operations, including those downhole, which may fall in the temperature ranges 80'C to 250° C., 100° C. to 200° C., or higher. Conversion of free carboxylic acid groups from the anhydride to an acid salt, an ester, or an amide group following the initial reaction to produce an asphaltene inhibitors in accordance with the present disclosure may prevent undesirable reverse reactions in which the anhydride reforms and the hydroxy-functional dendrimer, hydroxyalkyl acrylate copolymer, or polyol is eliminated.

In one or more embodiments, conversion of free carboxylic acid groups to a salt (neutralization) may be accomplished by adding an inorganic base such as sodium hydroxide, potassium hydroxide, potassium carbonate, sodium silicates, sodium phosphates calcium hydroxide, or an organic base such as sodium methoxide, potassium acetate, ammonia or a primary, secondary, or tertiary amine, a $C_6$-$C_{30}$ fatty amine, including aliphatic, cycloaliphatic, and aromatic amines. In some embodiments the neutralizing agent may be a tertiary amine such as triethylamine. Neutralization can also be accomplished using solid bases such as basic alumina or basic ion exchange resins in some embodiments.

Neutralizing agents in accordance with the present disclosure may prevent the reformation of cyclic anhydride species by complexing with nucleophilic carboxylates within the molecular structure of an asphaltene inhibitor. Neutralizing agents may include tertiary amines such as trimethylamine, triethylamine, diethylaniline, pyridine or diethyl cyclohexylamine.

The reaction scheme below illustrates the effect of neutralization with a tertiary amine, where ROB refers to the hydroxy-functional reactant, such as a dendrimer, polyol, or hydroxyacrylate monomer, and NB represents a polyisobutylene group (or other alkyl chain) substituted on the succinic anhydride reactant:

one or more embodiments, asphaltene inhibitors may be reacted further to convert free carboxylates created from the opening of the cyclic anhydride to an amide or ester to prevent ring-closure side-reactions. Free carboxylic acid groups may be converted an ester or amide using methods that are well known to those skilled in the art. In one example, free carboxylic acids may be converted to esters by condensation with an alcohol or to an amide with a primary or secondary amine provides an amide, for instance.

Asphaltene inhibitors in accordance with the present disclosure may be added to a wellbore fluid formulation at a concentration that may range from 1 ppm to 10,000 ppm of the wellbore fluid in some embodiments, and from 5 ppm to 5,000 ppm in particular embodiments.

In one or more embodiments, asphaltene inhibitors may be used in conjunction with one or more aromatic solvents that may increase the dispersion and/or inhibitory effects of the treatment. Aromatic solvents in accordance with the present disclosure may be combined with an asphaltene inhibitor prior to injection downhole or subsequent to the injection of the asphaltene inhibitor or other wellbore fluid. Suitable aromatic solvents that may be used as a component of compositions in accordance with the present disclosure include benzenes, alkyl benzenes such as toluene, xylene, ethylbenzene, trimethyl benzene, cumene, mesitylene, combinations thereof, and the like. While a number of solvents are disclosed, it is also envisioned that other solvents may be selected that are miscible with petroleum fluids such as crude oil, condensates, diesel, and the like. In one or more embodiments, wellbore treatment compositions may contain one or more aromatic solvents at a percent by volume (v %) that ranges from 1 v % to 90 v %.

Wellbore Fluid Additives

Asphaltene inhibitors in accordance with the present disclosure may also be part of a multicomponent composition and combined with other production chemicals such as demulsifiers, chaotropic agents, surfactants including charged and nonionic surfactants, sorbitan esters, amphoteric surfactants, and the like, viscosity reducers, mutual solvents, corrosion inhibitors such as acid amine salts, imidazolines and quaternary amines, demulsifiers such as alkoxylated resins, alkoxylated polyols and alkoxylated polyesters, paraffin inhibitors such as ethylene vinyl acetate copolymers, alpha olefin maleate and furmarate polyesters, and vinyl acetate, naphthenate inhibitors, and the like.

EXAMPLES

The present disclosure is further exemplified by the examples below which are presented to illustrate certain specific embodiments of the disclosure but are not intended to be construed so as to be restrictive of the spirit and scope thereof.

Synthesis Examples

In a first example, an asphaltene inhibitor was prepared by reacting 1 kDa PIBSA with a hydroxy-functional dendrimer. Compositions with various PIBSA/dendrimer molar ratio were synthesized and denoted as Samples 1a-1f as shown below in Table 1. Asphaltene inhibitors were also prepared by reacting PIBSA with hydroxyethyl methacrylate before polymerization, denoted Samples 2a-2c in Table 1, and by reacting PIBSA with glycerol, denoted 3a-3b.

TABLE 1

Asphaltene inhibitor Compositions

| Sample | Alkyl Succinic Anhydride (ASA) | Polyhydroxy component | Ratio ASA:PN | Molecular Weight |
|---|---|---|---|---|
| 1a | PIBSA | dendrimer | 1:1 | — |
| 1b | PIBSA | dendrimer | 5:1 | — |
| 1c | PIBSA | dendrimer | 10:1 | — |
| 1d | PIBSA | dendrimer | 15:1 | — |
| 1e | PIBSA | dendrimer | 20:1 | — |
| 1f | PIBSA | dendrimer | 23:1 | — |
| 2a | PIBSA | hydroxyethyl methacrylate | 1:1 | 100 kDa |
| 2b | PIBSA | hydroxyethyl methacrylate | 1:1 | 55 kDa |
| 2c | PIBSA | hydroxyethyl methacrylate | 1:1 | 25 kDa |
| 3a | PIBSA | glycerol | 3:2 | — |
| 3b | PIBSA | glycerol | 3:2 | — |

Preparation of Sample 2(c)

Samples assayed also included polymeric asphaltene inhibitors prepared from a reaction of PIBSA with 2-hydroxyethyl methacrylate, which may be summarized as follows:

Sample 2(c) was prepared from polyisobutylene succinic anhydride ("PIBSA 1000," 8,834 kg, product of Innospec Fuel Specialties), which was preheated to 80° C. and charged to a reaction vessel, followed by solvent SOLVESSO™ 150 ND (5318 kg). The mixture was then heated to 60° C. 2-Hydroxyethyl methacrylate ("Visiomer® HEMA 98," 902 kg, 1.05 eq. per eq. of PIBSA 1000, product of Evonik) was then added, and the mixture was heated to 130° C. and held at 130° C. for 2 h. The reaction mixture was analyzed by infrared spectroscopy to follow the disappearance of anhydride functionality. When the reaction was complete, the mixture was cooled to 100° C. Solvent SOLVESSO™ 150 ND (4386 kg) was added, followed by lauryl mercaptan (76 kg), and the mixture was heated to 120° C. A mixture of t-butyl perbenzoate (134 kg) in SOLVESSO™ 150 ND (408 kg) was added slowly over 5 h at a constant rate while maintaining the reaction temperature at or below 120° C. When the initiator addition was complete, the mixture was held at 120° C. for 1 h. The reaction product had about 50% solids content.

GPC analysis of the reaction product showed two distinct populations of products, with the higher molecular weight fraction (about 50%) having number average molecular weight ($M_n$)=16,800 and weight average molecular weight ($M_w$)=28,200 ($M_w/M_a$=1.7). This fraction represents the expected homopolymer product. The lower molecular weight fraction (about 50%) has $M_n$=1800 and $M_w$=2900, which may represent unconverted PIBSA.

Preparation of Sample 2(b)

Sample 2(b) was prepared from polyisobutylene succinic anhydride ("PIBSA 1000," 8,800 kg, product of Innospec Fuel Specialties) by preheating to 80° C. and charging the compound to a reaction vessel, followed by SOLVESSO™ 150 ND (5298 kg). The mixture was heated to 60° C. 2-Hydroxyethyl methacrylate ("Visiomer® HEMA 98," 898 kg, 1.05 eq. per eq. of PIBSA 1000, product of Evonik) was added, and the mixture was then heated to 130° C. and held at 130° C., for 2 h. The reaction mixture was analyzed by infrared spectroscopy to follow the disappearance of anhydride functionality. When the reaction was complete, the mixture is cooled slightly to 120° C. A mixture of t-butyl perbeozoate (134 kg) ire SOLVESSO™ 150 ND (408 kg) was added slowly over 5 h at a constant rate while maintaining the reaction temperature at or below 120° C. When the initiator addition was complete, the mixture is held at 120° C. for 1 h. The reaction product was diluted with SOLVESSO™ 150 ND (4462 kg) to about 50% solids content.

GPC analysis of the reaction product showed two distinct populations of products, with the higher molecular weight fraction (about 60%) having $M_n$=42,900 and $M_w$=92,200 ($M_w/M_n$=2,1). This fraction represented the expected homopolymer product. The lower molecular weight fraction (about 40%) had $M_n$=1960 and $M$ 3550 and may represent unconverted PIBSA.

Preparation of Sample Composition 1(e)

Sample 1(e) was prepared from BOLTORN™ H311 dendrimer (1,958 kg, 90% active in water, product of PERSTORP) which was preheated to 70° C. and pumped into a reaction vessel. SOLVESSO™ 150 ND solvent (8,000 kg, product of ExxonMobil Chemical) was added. The mixture was heated to 100° C. and vacuum was applied to remove water until the water content was less than 0.10 wt. %; about 1800 g of solvent/water mixture is removed. Polyisobutylene succinic anhydride ("PIBSA 1000," 8,240 kg, 20 equivalents per equivalent of BOLTORN™ H311 dendrimer, product of Innospec Fuel Specialties) preheated to 80° C. was added to the reactor, and the mixture was heated to 120° C. and held for 2 h at 120° C. Infrared spectroscopy was used to monitor the reaction progress. Heating for another hour at 120° C. was used if needed. When the reaction was complete, the product was diluted with additional SOLVESSO™ 150 ND solvent (3600 kg) to about 50% solids content.

Gel permeation chromatography (GPC) analysis of the reaction product was performed using a Varian PL-GPC-50 with Polypore columns, a refractive index detector, THF solvent (40 mg sample/mL), and polystyrene standards. The chromatogram showed two distinct populations of products, with the higher molecular weight fraction having $M_n$=20,400; $M_w$=32,600 ($M_w/M_n$=1.6). This fraction also represented the expected product. The lower molecular weight fraction had $M_n$=1600 and $M_w$=2570, which may represent unconverted PIBSA.

Application Example 1

Asphaltene Inhibitor Testing

The stabilization/dispersion performance of the prepared asphaltene inhibitor compositions were evaluated under various tests that are described below, with various crude oils. Asphaltene inhibitor testing included evaluation of the asphaltene content of crude oils and the ability of various products to disperse asphaltene. The procedure follows method SPE 28972 asphaltene inhibitor test (ADT). In the ADT, heptane is used as a non-polar solvent that promotes the agglomeration and precipitation of polar asphaltene. The test operates under the principle that effective asphaltene inhibitors will disperse and stabilize asphaltene in the non-polar solvent, and less precipitation relative to a control without the asphaltene inhibitor will be observed. In this test, the petroleum fluid was diluted with xylene. Inhibitor concentrations reported in the following tables are to he understood as the amount of the selected asphaltene inhibitor with respect to the amount of crude oil.

Examples of asphaltene inhibitors were combined with live different types of crude oil from distinct formations to study the effectiveness of the inhibitors with differing oil compositions. The results for each inhibitor are shown below in Tables 2-6.

TABLE 2

Dispersion testing for oil sample 1 using testing method 1

| Sample | Inhibitor concentration (ppm) | Asphaltene precipitation inhibition (%) | |
|---|---|---|---|
| | | 2 hr | 6 hr |
| Blank | 0 | 0 | 0 |
| 1b | 150 | 86.7 | 76.9 |
| 1b | 200 | 80 | 76.9 |
| 1c | 150 | 66.7 | 84.6 |
| 1c | 200 | 66.7 | 92.3 |
| 1d | 150 | 61.1 | 66.7 |
| 1d | 200 | 61.1 | 53.3 |
| 1e | 150 | 100 | 76.9 |
| 1e | 200 | 100 | 84.6 |
| 1e | 150 | 61.1 | 33.3 |
| 1e | 200 | 61.1 | 53.3 |
| 1f | 150 | 50 | 46.7 |
| 1f | 200 | 55.6 | 53.3 |
| 2a | 150 | 91.7 | 90 |
| 2a | 200 | 97.2 | 96.7 |
| 2b | 150 | 77.8 | 86.7 |
| 2b | 200 | 83.3 | 93.3 |

TABLE 3

Dispersion testing for oil sample 2 using testing method 1

| Sample | Inhibitor concentration (ppm) | Asphaltene precipitation inhibition (%) | |
|---|---|---|---|
| | | 2 hr | 6 hr |
| Blank | 0 | 0 | 0 |
| Example 1c | 200 | 97.2 | 85.7 |
| Example 1d | 150 | 50 | 50 |
| Example 1d | 200 | 100 | 88.6 |
| Example 1e | 125 | 100 | 95 |
| Example 1e | 150 | 95 | 75 |
| Example 1e | 200 | 100 | 100 |
| Example 1f | 125 | 50 | 37.5 |
| Example 1f | 150 | 75 | 62.5 |
| Example 1f | 200 | 100 | 92.9 |

TABLE 3-continued

Dispersion testing for oil sample 2 using testing method 1

| Sample | Inhibitor concentration (ppm) | Asphaltene precipitation inhibition (%) | |
|---|---|---|---|
| | | 2 hr | 6 hr |
| Example 2a | 150 | 75 | 62.5 |
| Example 2a | 200 | 100 | 100 |
| Example 2b | 200 | 88.9 | 78.6 |

TABLE 4

Dispersion testing for oil sample 3 using testing method 1

| Sample | Inhibitor concentration (ppm) | Asphaltene precipitation inhibition (%) | |
|---|---|---|---|
| | | 2 hr | 6 hr |
| Blank | 0 | 0 | 0 |
| Example 1b | 50 | 100 | 80 |
| Example 1c | 150 | 100 | 100 |
| Example 1c | 50 | 100 | 95 |
| Example 1d | 150 | 100 | 100 |
| Example 1d | 50 | 100 | 100 |
| Example 1e | 150 | 100 | 100 |
| Example 1e | 50 | 100 | 100 |
| Example 1f | 150 | 100 | 100 |
| Example 1f | 50 | 100 | 100 |
| Example 2a | 150 | 100 | 100 |
| Example 2a | 50 | 100 | 100 |
| Example 2b | 150 | 100 | 100 |
| Example 2b | 50 | 100 | 80 |

TABLE 5

Dispersion testing for oil sample 4 using testing method 1

| Sample | Inhibitor concentration (ppm) | Asphaltene precipitation inhibition (%) | |
|---|---|---|---|
| | | 2 hr | 6 hr |
| Blank | 0 | 0 | 0 |
| Example 1b | 25 | 100 | 0 |
| Example 1b | 25 | 40 | 25 |
| Example 1b | 50 | 100 | 80 |
| Example 1c | 25 | 60 | 43.8 |
| Example 1c | 50 | 100 | 95 |
| Example 1c | 50 | 80 | 50 |
| Example 1c | 75 | 77.8 | 64.3 |
| Example 1c | 100 | 90 | 85.7 |
| Example 1e | 25 | 95 | 50 |
| Example 1e | 50 | 95 | 50 |
| Example 1e | 75 | 96.7 | 95.7 |
| Example 1e | 100 | 96.7 | 95.7 |

TABLE 6

Dispersion testing for oil sample 5 using testing method 1

| Sample | Inhibitor concentration (ppm) | Asphaltene precipitation inhibition (%) | |
|---|---|---|---|
| | | 2 hr | 6 hr |
| Blank | 0 | 0 | 0 |
| Example 1d | 200 | 36.4 | 12.5 |
| Example 1e | 100 | 45 | 25 |
| Example 1e | 200 | 100 | 93.8 |
| Example 1e | 300 | 100 | 90 |
| Example 1f | 200 | 95.5 | 75 |

TABLE 6-continued

Dispersion testing for oil sample 5 using testing method 1

| Sample | Inhibitor concentration (ppm) | Asphaltene precipitation inhibition (%) | |
|---|---|---|---|
| | | 2 hr | 6 hr |
| Example 1f | 300 | 100 | 93.8 |
| Example 2a | 200 | 100 | 50 |
| Example 2a | 300 | 100 | 93.8 |
| Example 2b | 200 | 100 | 75 |
| Example 2b | 300 | 100 | 93.8 |
| Example 3a | 200 | 100 | 68.8 |
| Example 3a | 300 | 100 | 87.5 |
| Example 3b | 200 | 45 | 50 |
| Example 3b | 300 | 85 | 81.3 |

Application Example 2

In the next example, asphaltene inhibitor testing was monitored using an optical turbidity scanner (FORMULACTION TURBISCAN™ MA2000) to compare products and concentrations in accordance with ASTM method D-7061. The inhibitor test measures sample asphaltene inhibitors for their ability to maintain asphaltene compounds suspended in crude over a defined period, which may be used to determining the minimum concentration of inhibitor to achieve similar results in the field and prevent deposition in process equipment.

Figure 1:
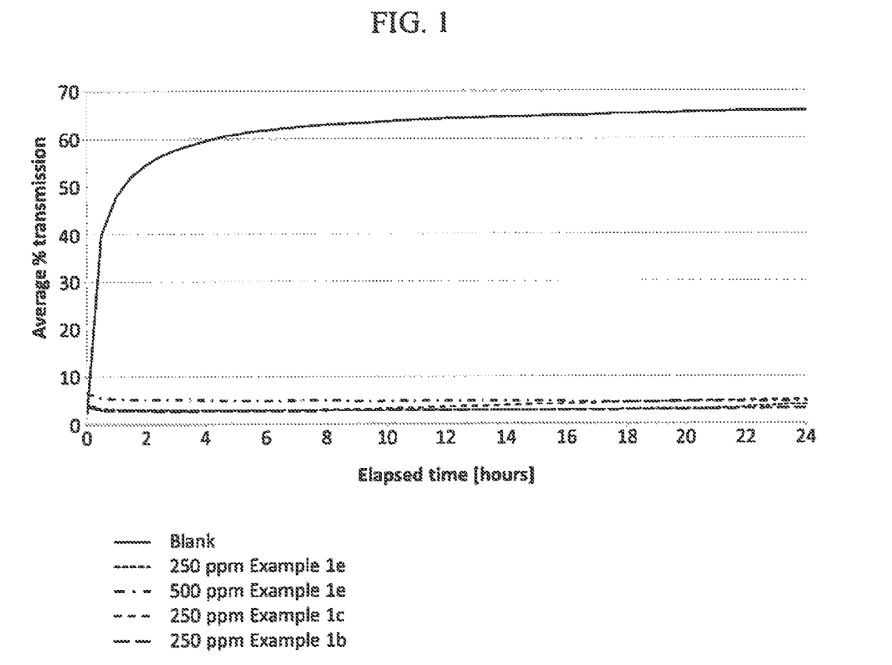
FIGS. 1 and 2 are graphical representations of asphaltene inhibition as measured by percent average transmission as a function of time in accordance with embodiments of the present disclosure.
Figure 2:
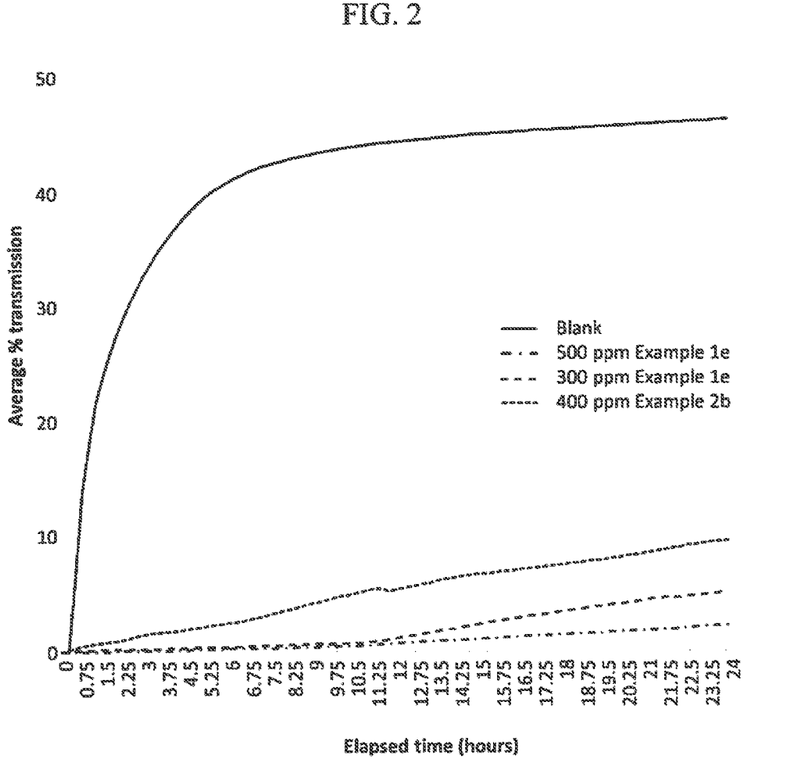

During analysis, asphaltene inhibitor formulations were combined with a sample of crude oil and the turbidity was measured over time as shown in FIG. 1. Crude oil 5 was also combined with various asphaltene inhibitors and analyzed as shown in FIG. 2. A separate test was also conducted on samples 2a and 2b at 150 ppm, resulting in <10% light transmission after 24 hours test for each sample, respectively.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:
1. A method comprising:
   emplacing into a hydrocarbon production stream a composition comprising an asphaltene inhibitor, wherein the asphaltene inhibitor comprises the formula:

wherein R1 is an alkyl chain having a carbon number in the range of greater than 40 to 200, R2 is a multiester group, R3 is hydrogen, an ion, or an alkyl chain having a carbon number in the range of 1 to 200, m is an integer selected from 0 to 4, and n is an integer selected from the range of 0 to 4, wherein the sum of m and is 1 or greater;

wherein the asphaltene inhibitor is prepared from an esterification reaction between a hydroxy-functional dendrimer and an alkyl cyclic anhydride; and wherein the asphaltene inhibitor is prepared from an esterification reaction between a polyalcohol core and a hydroxy acid.

2. The method of claim 1, wherein the multiester group comprises 8 to 30 esters.

3. The method of claim 1, wherein the asphaltene inhibitor is added to the hydrocarbon production stream up to a concentration in the range of 10 ppm to 1,000 ppm.

4. The method of claim 1, wherein the multiester group is prepared from a reaction in which the ratio of the alkyl succinic anhydride to the a hydroxy-functional dendrimer is within the range of 1:1 to n:1, wherein n is an integer describing the total number of hydroxy groups on the hydroxy-functional dendrimer.

5. The method of claim 1, wherein the multiester group is prepared from a polyol selected from a group consisting of glycerol, propylene glycol, butanetriol, inositol, erythritol, sorbitol, mannitol, and xylitol.

6. The method of claim 1, wherein the composition further comprises an aromatic solvent.

7. The method of claim 6, wherein the aromatic solvent is one or more selected from a group consisting of benzene, toluene, xylene, and trimethyl benzene.

8. The composition of claim 6, wherein the aromatic solvent is at a percent by volume (v %) of the composition that ranges from 1 v % to 90 v %.

9. A method comprising:
emplacing in a wellbore a composition comprising an asphaltene inhibitor, wherein the asphaltene inhibitor comprises esters of the formula:

wherein R1 is an alkyl chain having a carbon number in the range of greater than 40 to 200; R2 is a multiester group; R3 is hydrogen, an ion, or an alkyl chain having a carbon number in the range of 1 to 200; m is an integer selected from 0 to 4; and n is an integer selected from the range of 0 to 4, wherein the sum of m and n is 1 or greater; wherein the asphaltene inhibitor is prepared from an esterification reaction between a hydroxy-functional dendrimer and an alkyl cyclic anhydride; and wherein the hydroxy-functional dendrimer is prepared from the reaction between a polyalcohol core and a hydroxy acid.

10. The method of claim 9, wherein the asphaltene inhibitor is added to a wellbore fluid within the wellbore up to a concentration in the range of 10 ppm to 1,000 ppm.

11. The method of claim 9, wherein the multiester group comprises 8 to 30 esters.

12. The method of claim 9, wherein the asphaltene inhibitor has a molecular weight in the range of 900 Da to 100,000 Da.

13. The method of claim 9, wherein the multiester group is prepared from a polyol selected from a group consisting of glycerol, propylene glycol, butanetriol, inositol, erythritol, sorbitol, mannitol, and xylitol.

14. The method of claim 9, wherein the composition further comprises an aromatic solvent.

* * * * *